(12) United States Patent
Sharma et al.

(10) Patent No.: US 12,531,051 B2
(45) Date of Patent: Jan. 20, 2026

(54) SYSTEM AND METHOD FOR SECURE PROCESSING OF SPEECH SIGNALS USING PSEUDO-SPEECH REPRESENTATIONS

(71) Applicant: Microsoft Technology Licensing, LLC, Redmond, WA (US)

(72) Inventors: Dushyant Sharma, Tracy, CA (US); William Francis Ganong, III, Brookline, MA (US); Daniel Paulino Almendro Barreda, Barcelona (ES); Patrick Aubrey Naylor, Reading (GB); Alvaro Martin Iturralde Zurita, Montrel (CA); Francesco Nespoli, London (GB)

(73) Assignee: Microsoft Technology Licensing, LLC., Redmond, WA (US)

( * ) Notice: Subject to any disclaimer, the term of this patent is extended or adjusted under 35 U.S.C. 154(b) by 246 days.

(21) Appl. No.: 18/326,631

(22) Filed: May 31, 2023

(65) Prior Publication Data

US 2024/0404504 A1    Dec. 5, 2024

(51) Int. Cl.
| | | |
|---|---|---|
| *G10L 13/033* | (2013.01) | |
| *G06F 21/62* | (2013.01) | |
| *G10L 13/08* | (2013.01) | |
| *G10L 15/22* | (2006.01) | |
| *G10L 15/26* | (2006.01) | |
| *G10L 19/018* | (2013.01) | |

(52) U.S. Cl.
CPC ............ *G10L 13/033* (2013.01); *G10L 13/08* (2013.01); *G10L 15/22* (2013.01); *G10L 15/26* (2013.01); *G10L 19/018* (2013.01)

(58) Field of Classification Search
CPC ....... G10L 15/22; G10L 15/26; G10L 13/033; G06F 21/60
See application file for complete search history.

(56) References Cited

U.S. PATENT DOCUMENTS

2020/0258535 A1* 8/2020 Vatanparvar ......... A61B 5/4803
2021/0012026 A1* 1/2021 Taylor .................... G06N 20/00
2022/0199093 A1* 6/2022 Ramadas ............ G06F 21/6254

FOREIGN PATENT DOCUMENTS

| WO | 2014042715 A1 | 3/2014 |
| WO | 2021219554 A1 | 11/2021 |

OTHER PUBLICATIONS

International Search Report and Written Opinion received for PCT Application No. PCT/US2024/030184, Sep. 16, 2024, 19 pages.
Invitation to pay additional fees received for PCT Application No. PCT/US2024/030184, Jul. 26, 2024, 9 pages.
Son, et al., "An Acoustic Description of Consonant Reduction," Speech Communication, vol. 28, Issue 2, Jun. 1, 1999, pp. 125-140.

(Continued)

*Primary Examiner* — Jialong He
(74) *Attorney, Agent, or Firm* — Foley IP Law, PLLC

(57) ABSTRACT

A method, computer program product, and computing system for processing a speech signal. A sensitive portion of the speech signal is identified. A pseudo-speech representation of the sensitive portion is generated using a voice converter system. Speech processing is performed on the speech signal and the pseudo-speech representation of the sensitive portion using a speech processing system.

18 Claims, 6 Drawing Sheets

(56) References Cited

OTHER PUBLICATIONS

"Vowel reduction", Retrieved From: https://en.wikipedia.org/wiki/Vowel_reduction, Jan. 23, 2022, 6 Pages.

Georges, et al., "Towards an articulatory-driven neural vocoder for speech synthesis", 12th International Seminar on Speech Production, Dec. 2020, 2 Pages.

Koch, et al., "DigitalPhonetics / IMS-Toucan", Retrieved From: https://github.com/DigitalPhonetics/IMS-Toucan, Mar. 23, 2023, 11 Pages.

Lux, et al., "Language-Agnostic Meta-Learning for Low-Resource Text-to-Speech with Articulatory Features", In Repository of arXiv:2203.03191v1, Mar. 7, 2022, 12 Pages.

Murphy, James J., "Demosthenes", Retrieved From: https://www.britannica.com/biography/Demosthenes-Greek-statesman-and-orator, May 7, 2022, 10 Pages.

Sedivy, Julie, "Mumbling Isn't a Sign of Laziness—It's a Clever Data-Compression Trick", Retrieved From: https://nautilus/mumbling-isnt-a-sign-of-lazinessits-a-clever-data_compression-trick-235301/, Feb. 18, 2015, 10 Pages.

Shor, et al., "Project Euphonia's Personalized Speech Recognition for Non-Standard Speech", Retrieved From: https://ai.googleblog.com/2019/08/project-euphonias-personalized-speech.html, Aug. 13, 2019, 7 Pages.

Weirich, et al., "Mumbling: Macho or Morphology?", In Journal of Speech, Language, and Hearing Research vol. 59, Dec. 2016, pp. 1587-1595.

* cited by examiner

SYSTEM AND METHOD FOR SECURE PROCESSING OF SPEECH SIGNALS USING PSEUDO-SPEECH REPRESENTATIONS

BACKGROUND

A recording of the voice of a speaker can be considered Personally Identifiable Information (PII) and sensitive content uttered by the speaker can also be considered PII. If that information concerns medical issues, the information can be considered Personal Health Information (PHI). In the context of a distributed speech processing system such as (cloud based) ASR, securing the privacy of a speaker's voice and any PII uttered by them is of paramount importance. As such, conventional efforts to remove PII and PHI from the audio that is transmitted and processed by the cloud ASR system include surrogation of PII elements of transcribed training data with a 'different' word (i.e., change "James" to "Jane"). For example, this surrogation is at the text level only (i.e., where the transcript has the surrogated text (text of "James" is changed to the text: "Jane") but no corresponding audio for the surrogated text. This is a problem for downstream speech processing systems, like ASR, since the replaced segments are either synthesized artificially or taken from other recordings (with significant background acoustics mismatching). Because surrogation without corresponding audio is not used in these conventional approaches, there are issues with signal discontinuities (i.e., digital zeros) appearing in the speech signals processed by the downstream speech processing system.

BRIEF DESCRIPTION OF THE DRAWINGS

Like reference symbols in the various drawings indicate like elements.

DETAILED DESCRIPTION OF THE PREFERRED EMBODIMENTS

Figure 1:
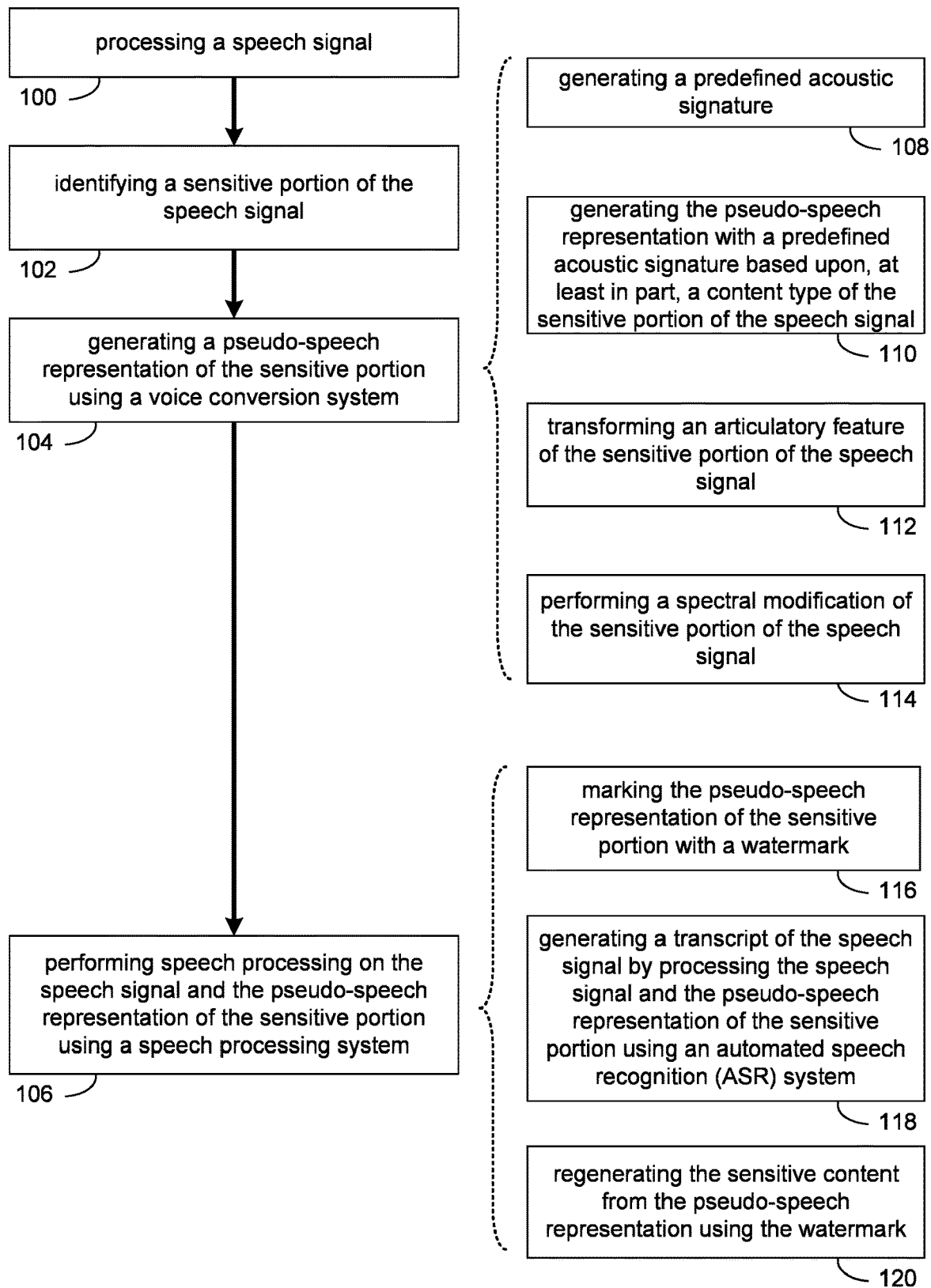
FIG. 1 is a flow chart of one implementation of the speech privacy process of FIG. 1.

Implementations of the present disclosure process a speech signal or audio stream from a user by using a voice converter system (thus removing the ability to identify the user through their voice) and by inserting pseudo-speech representations in the regions that contain sensitive content (e.g., PII or other private information). A pseudo-speech representation is an utterance or portion of a speech signal that has linguistic units (e.g., phonemes, segments, syllables, words, etc.) with reduced acoustic-phonetic substance (e.g., shorter duration and/or reduced articulation) that reduces the acoustic quality of the linguistic units. For example, pseudo-speech representations have speech characteristics but are generally unintelligible. An example of a pseudo-speech is a mumbling of a linguistic unit (e.g., a word or phrase) that sounds like a linguistic unit (e.g., a word or phrase) but is non-interpretable by a listener. As such, a pseudo-speech representation of sensitive content in combination with the voice converter-processed speech signal removes (or at least significantly reduces) the identity of the speaker and any PII information (e.g., because of the unintelligible pseudo-speech representation of the PII). As will be discussed in greater detail below, pseudo-speech representations mask or remove sensitive content (e.g., PII) without diminishing accuracy during downstream speech processing of the speech signal.

The details of one or more implementations are set forth in the accompanying drawings and the description below. Other features and advantages will become apparent from the description, the drawings, and the claims.

The Speech Privacy Process:

The widespread deployment of automatic speech recognition (ASR)-based systems demands increased efforts to secure sensitive content (e.g., Personal Identifiable Information (PII)) in speech signals. The need for such privacy protection is fueled not only by the recent privacy legislation, e.g., the general data protection regulation (GDPR) in Europe, but also by an increasing user-awareness of privacy issues.

As will be discussed in greater detail below, implementations of the present disclosure allow for the generation of pseudo-speech representations that modify sensitive content from speech signals in the form of unintelligible utterances without adversely impacting downstream speech processing systems. For example, suppose a speech signal includes sensitive content (e.g., PII) regarding a user's medical history. A conventional approach to obscuring the sensitive content would simply mask any private information (e.g., where the mask is a noise signal or a "zeroing out" of the sensitive information) in the text of a transcript. Following the surrogation, the speech signal is transmitted to a cloud-based speech processing system. As such, while the sensitive content is obscured in the text of the transcription, a speech processing system that receives the speech signal will process an inconsistent speech signal (e.g., relative to corresponding portions of the speech signal or the text of the transcription). Accordingly, by generating a pseudo-speech representation of the sensitive content in the manner described below, the speech processing system is able to process a consistent speech signal while either ignoring the pseudo-speech representations or by decoding the pseudo-speech representations using a watermark or other flag indicative of the type of pseudo-speech processing.

Referring to FIGS. 1-5, speech privacy process 10 processes 100 a speech signal. A sensitive portion of the speech signal is identified 102. A pseudo-speech representation of the sensitive portion is generated 104 using a voice converter system. Speech processing is performed 106 on the speech signal and the pseudo-speech representation of the sensitive portion using a speech processing system.

Figure 2:
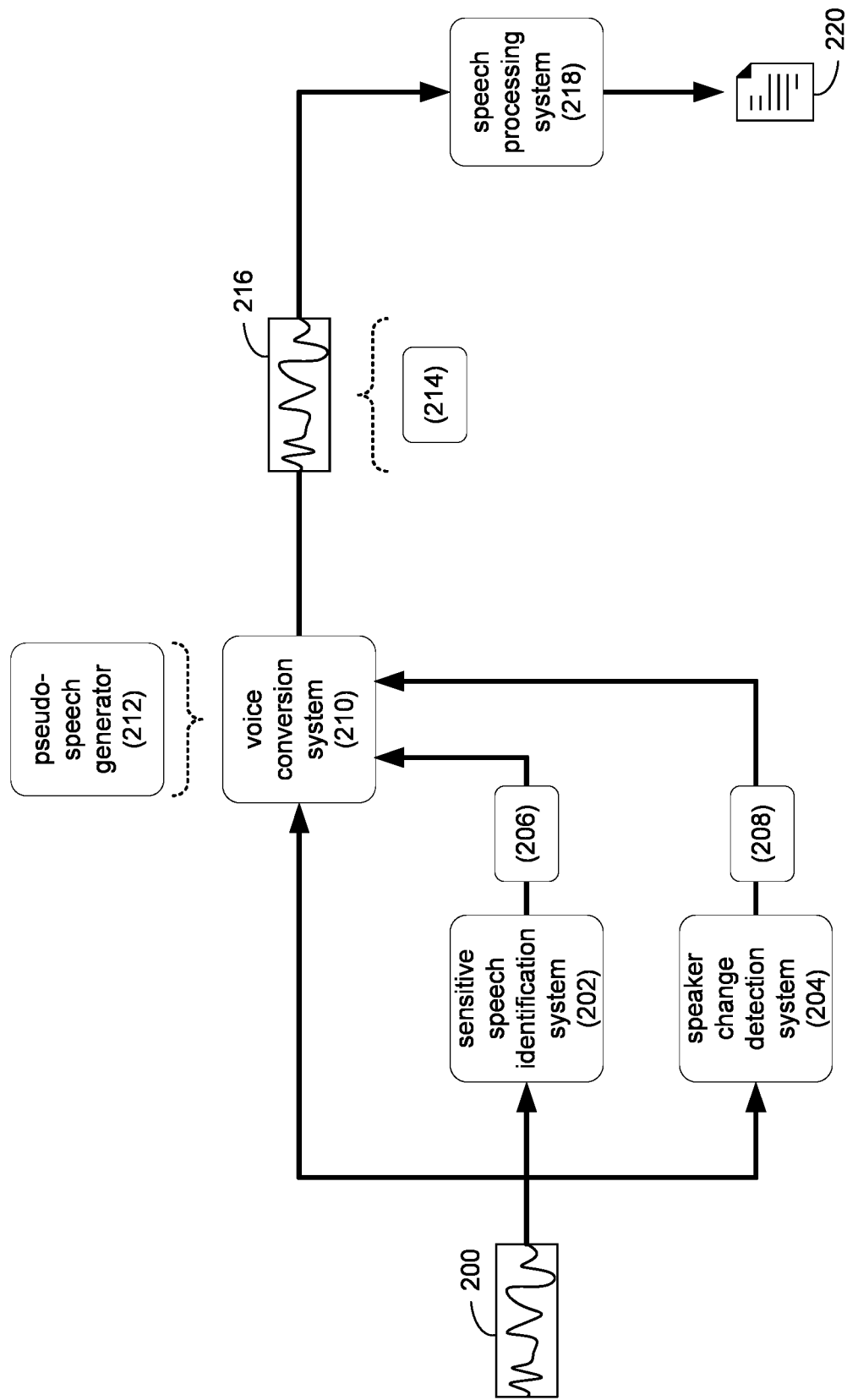
FIGS. 2-3 are diagrammatic views of the speech privacy process of FIG. 1.

In some implementations, speech privacy process 10 processes 100 a speech signal. For example, speech privacy process 10 receives a speech signal from a microphone or other audio acquisition device. Referring also to FIG. 2, speech privacy process 10 receives an input speech signal (e.g., speech signal 200). In one example, speech signal 200 is received and recorded by an audio recording system and/or may be a previously recorded audio input signal (e.g., an audio signal stored in a database or other data structure). In one example, suppose that speech signal 200 concerns a medical encounter between a medical professional and a patient. In this example, the patient may be asked by the medical professional to audibly confirm personal identification information (e.g., name, date of birth, marital status, etc.) during a medical examination. Additionally, the patient may describe personal health information (e.g., symptoms, medical history, etc.). As will be discussed in greater detail below, speech privacy process 10 processes the input speech signal to generate a transcription and/or to populate medical records automatically.

In some implementations, speech privacy process 10 identifies 102 a sensitive portion of the speech signal. A sensitive portion of the speech signal is a portion of Personal Identifiable Information (PII) or other content identified as private by law or other designation. For example, there are two elements in speech that can identify a speaker and therefore constitute PII: 1) the use of proper names, address and other personal information including for example financial data, health details, and culturally or ethnically specific information; and/or 2) the sound of the speaker's voice as determined by factors including pitch and pitch variation, vocal timbre and formants, tempo and other accent-related characteristics. For PHI, the Health Insurance Portability and Accountability Act (HIPAA) Privacy Rule provides federal protections for personal health information held by covered entities and gives patients an array of rights with respect to that information. Generally, PHI is any information that can be used to identify an individual and that was created, used, or disclosed in the course of providing a health care service such as diagnosis or treatment.

In one example and as shown in FIG. 2, speech privacy process 10 includes a sensitive speech identification system (e.g., sensitive speech identification system 202) configured to identify sensitive portions in the speech signal (e.g., speech signal 200). A sensitive speech identifying system is a hardware and/or software component configured to receive speech signals and identify or flag sensitive speech portions. In one example, sensitive speech identifying system includes a machine learning model configured to natural language processing (NLP)/natural language understanding (NLU) to identify sensitive portions of a speech signal. For example, sensitive speech identification system 202 accesses one or more databases or other resources with examples of PII and/or PHI to identify sensitive content within a speech signal. In some implementations, sensitive speech identification system 202 identifies 102 sensitive portions of a speech signal by comparing particular portions of the speech signal to known examples of PII and/or PHI. For instance, sensitive speech identification system 202 generates a confidence score indicating the similarity between a sensitive portion and examples of known sensitive content (e.g., examples of PII and/or PHI) and compares the confidence score to one or more predefined thresholds to identify 102 sensitive portions of speech signal 200. In one example, portions of speech signal 200 that have at least a 50% confidence score are identified 102 as sensitive portions while portions of speech signal 200 that have less than a 50% confidence score are not identified as sensitive portions.

In some implementations, speech privacy process 10 uses speaker change detection (e.g., speaker change detector 204) to segment speech signal 200 into a plurality of segments or signals based upon each distinct speaker detected in each segment of the speech signal. Speaker change detector 204 is a hardware and/or software component configured to partition an input audio stream into homogeneous segments according to the speaker identity. For example, suppose speaker change detector 204 processes speech signal 200 and identifies two speakers (i.e., time stamps for changes in the speaker of speech signal 200 with labels for each speaker). In one example, speaker change detector 204 does not know the identity of each speaker but recognizes the acoustic properties of speech signals unique to each speaker. In another example, speaker change detector 204 knows (e.g., with a threshold level of confidence when comparing speech characteristics to known speaker embeddings) the identity of each speaker and generates labels and/or time stamps to designate portions of speech signal 200 that are spoken by one speaker relative to another speaker. For example, speaker change detector 204 accesses a database or other source of voiceprints associated with a plurality of known speakers. Accordingly, speech privacy process 10 is able to determine the identify of each speaker in speech signal 200 with the speech portions associated with one speaker (e.g., a doctor) and speech portions associated with another speaker (e.g., a patient). In this manner, speech portions associated with particular speakers are identified.

In some implementations, speech privacy process 10 allows users to register a particular voice as sensitive speech and/or particular words or phrases as sensitive (e.g., PII). For example, speech privacy process 10 provides a user interface configured to receive a selection of particular portions of speech signal 200 or voice characteristics to identify 102 as sensitive content within speech signal 200. In this manner, a user of speech privacy process 10 is able to register sensitive content for a particular speech signal, for multiple speech signals, and/or for particular types of speech signal.

Referring again to FIG. 2 and in some implementations, speech privacy process 10 identifies 102 a sensitive portion (e.g., sensitive portion 206) from speech signal 200 using sensitive speech identification system 202. In this example, speech privacy process 10 identifies changes in speakers within speech signal 200 using speaker change detection system 204 in the form speaker information (e.g., speaker information 208). As will be discussed in greater detail below, speech privacy process 10 provides identified sensitive portion 206 and/or identified speaker information 208 to a voice converter system (e.g., voice converter system 210) to generate a pseudo-speech representation of sensitive portion 206.

In some implementations, speech privacy process 10 generates 104 a pseudo-speech representation of the sensitive portion using a voice converter system. A pseudo-speech representation is an utterance or portion of a speech signal that has linguistic units (e.g., phonemes, segments, syllables, words, etc.) with reduced acoustic-phonetic substance (e.g., shorter duration and/or reduced articulation) that reduces the acoustic quality of the linguistic units. In some implementations, a pseudo-speech representation is a mumbling of the sensitive portion of the speech signal. For example, pseudo-speech representations have speech characteristics but are generally unintelligible to a listener. An example of a pseudo-speech is a mumbling of a linguistic unit (e.g., a word or phrase) such that resulting mumbled speech sounds like a linguistic unit (e.g., a word or phrase) but is non-interpretable by a listener. In some implementations, speech privacy process 10 generates 104 a pseudo-speech representation of sensitive portion 206 of speech signal 200 using a pseudo-speech generator (e.g., pseudo-speech generator 212). Pseudo-speech generator 212 is a hardware and/or software component configured to convert sensitive portions into pseudo-speech representations of the sensitive portions that are unintelligible to a listener. As will be described in greater detail below, pseudo-speech generator 212 is a portion of a voice converter system (e.g., voice converter system 210) or is configured to provide pseudo-speech representations to voice converter system 210 for generating a secure speech signal.

In some implementations, generating 104 the pseudo-speech representation includes generating 108 a predefined acoustic signature. A predefined acoustic signature is a predefined portion of audio that is used as a substitute to a sensitive portion when generating a secure speech signal. For example, suppose sensitive portion 206 includes a patient's birthdate information obtained in speech signal 200 during a consultation with a medical professional. In this example, speech privacy process 10 generates 104 a pseudo-speech representation for the patient's birthdate by generating 108 a predefined acoustic signature (e.g., an acoustic representation of the word "mumble") to replace the patient's birthdate. In this example, a secure speech signal (e.g., secure speech signal 216) generated from speech signal 200 and a pseudo-speech representation of sensitive portion 206 (e.g., pseudo-speech representation 214) includes the predefined acoustic signature (e.g., the word "mumble") in place of sensitive portion 206. In this manner, a downstream speech processing system does not process sensitive portion 206 but rather processes the predefined acoustic signature. In some implementations, the predefined acoustic signature is user-defined (e.g., using a user interface) or a default signature (e.g., the word "mumble"). As will be discussed in greater detail below and in some implementations, the speech processing system is pseudo-speech-aware (e.g., with training data or other constraints) such that the predefined acoustic signature is ignored.

In some implementations, generating 104 the pseudo-speech representation includes generating 110 the pseudo-speech representation with a predefined acoustic signature based upon, at least in part, a content type of the sensitive portion of the speech signal. A content type is a particular category or format for various types of data. Examples of content types include given names, surnames, date information, address information, financial information, medical information, legal information, etc. In some implementations, speech privacy process 10 generates 110 unique pseudo-speech representations for each content type for the sensitive portions. Suppose sensitive portion 206 includes a patient's birthdate information, the patient's name, and medical diagnosis information concerning the patient obtained in speech signal 200 during a consultation with a medical professional. In this example, speech privacy process 10 generates a pseudo-speech representation of the patient's name by generating a predefined acoustic signature based on the content type (e.g., the phrase "a-name" for the "name" content type). Speech privacy process 10 generates a pseudo-speech representation of the patient's birthdate by generating a predefined acoustic signature based on the content type (e.g., the phrase "a-date" for the "date" content type). Additionally, speech privacy process 10 generates a pseudo-speech representation of the patient's medical diagnosis information by generating a predefined acoustic signature based on the content type (e.g., the phrase "a-medical information" for the "medical information" content type). In some implementations, the predefined acoustic signature for each content type is user-defined (e.g., using a user interface) or a default signature (e.g., the phrase "a-name" for the "name" content type; the phrase "a-date" for the "date" content type; and the phrase "a-medical information" for the "medical information" content type).

In some implementations, generating 104 the pseudo-speech representation includes mapping the sensitive portion to a predefined pseudo-speech representation of a plurality of predefined pseudo-speech representations. For example, speech privacy process 10 may define a plurality of predefined pseudo-speech representations for a plurality of corresponding sensitive portions. The plurality of predefined pseudo-speech representations and the plurality of corresponding sensitive portions are recorded in a database or dictionary file. For example, suppose speech privacy process 10 identifies 102 sensitive portion 206 concerning a speaker's home address. In this example, the number of the address (e.g., "1") is mapped to a predefined pseudo-speech representation that acoustically sounds like "umm" and the street name (e.g., "Main Street") is mapped to two corresponding predefined pseudo-speech representations that acoustically sound like "Emm" and "stree". As shown in the example, a plurality of sensitive portions of a speech signal are mapped to corresponding respective pseudo-speech representations. In some implementations, the plurality of pseudo-speech representations for a plurality of corresponding sensitive portions are user-defined (e.g., using a user interface).

In some implementations, generating 104 the pseudo-speech representation includes transforming 112 an articulatory feature of the sensitive portion of the speech signal. An articulatory feature is a property of a speech sound based on its voicing or on its place or manner of articulation in the vocal tract, such as voiceless, bilabial, or stop used in describing the sound. In some implementations, speech privacy process 10 transforms 112 the articulator features of a sensitive portion to mimic the effect of mumbling, such as the mumbling resulting from reduced jaw movement. When transforming articulatory features, speech privacy process 10 detects whether the sensitive portion is vocalic (e.g., concerning vowels) or consonantic (e.g., concerning consonants). For vocalic consonants, speech privacy process 10 performs a reduction where the vowel space features are neutralized (e.g., by reducing front vowels; reducing back vowels; reducing high vowels (e.g., close vowels); reducing low vowels; and/or by reducing tense vowels). In some implementations, these reductions leave some features left and create "schwa"-like vowels that are central and close to each other. For consonants, speech privacy process 10 transforms each stop consonant into an approximant (e.g., by adding continuant (e.g., the passage of air through the vocal tract where adding continuant includes pseudo-speech representations produced without significant obstruction in the tract, allowing air to pass through in a continuous stream); adding sonorant (e.g., the type of oral constriction that can occur in the vocal tract where adding sonorant designates the vowels and sonorant consonants (namely glides, liquids, and nasals) that are produced without an imbalance of air pressure in the vocal tract that might cause turbulence), and by reducing delayed release (e.g., when affricate consonants are present)). In some implementations to address fricatives, speech privacy process 10 transforms 112 consonants by reducing stridency (e.g., a type of friction that is noisier than usual that is generally caused by high energy white noise). In some implementations, speech privacy process 10 leaves nasal features and lateral features within sensitive portions as they are when generating pseudo-speech representations.

In some implementations, generating 104 the pseudo-speech representation includes performing 114 a spectral modification of the sensitive portion of the speech signal. Performing a spectral modification in speech processing is analogous to hearing a word of about the right duration, pitch profile, and loudness so that it does not introduce discontinuities into the information, but due to modifications, no significant information in the word can be recognized. In some implementations, performing a spectral modification to generate a pseudo-speech representation for a sensitive portion includes attenuating one or more consonants within the sensitive portion by identifying time-frequency bins with high frequency energy (e.g., above a predefined threshold) and attenuating them. For example, suppose the predefined frequency energy threshold is 1 kHz. In this example when processing sensitive portion 206, speech privacy process 10 performs 114 a spectral modification by identifying time-frequency bins in sensitive portion 206 with a frequency energy greater than 1 kHz and by attenuating those time-frequency bins below 1 kHz.

In another example, performing a spectral modification to generate a pseudo-speech representation for a sensitive portion includes reducing the rate of change of the spectrum overall (e.g., by modelling a reduced clarity of articulation). For example, speech privacy process 10 reduces the rate of change in the spectrum of the sensitive portion by filtering certain frequencies. In one example, speech privacy process 10 uses low pass filtering in the modulation domain to remove modulations above a predefined threshold. One example of the predefined threshold is 10 Hz. In some implementations, the predefined threshold is a user-defined value and/or a default value.

In some implementations, speech privacy process 10 uses a combination of the above-described approaches for performing a spectral modification to generate pseudo-speech representations. For example, performing a spectral modification to generate pseudo-speech representations includes attenuating one or more consonants within the sensitive portion by identifying and attenuating high energy time-frequency bins; reducing the rate of change in the spectrum of the sensitive portion by filtering certain frequencies; and changing the phonetic content fundamentally. In one example, performing 114 spectral modifications includes performing the following actions in a particular order: 1) changing the phonetic content fundamentally, 2) reducing the rate of change in the spectrum of the sensitive portion by filtering certain frequencies, and 3) attenuating one or more consonants within the sensitive portion by identifying and attenuating high energy time-frequency bins. However, it will be appreciated that different sequences of spectral modifications can be used for various cases.

In some implementations, voice conversion using a voice converter system includes generating a voice style transfer of the speech signal. A voice style transfer is the modification a speaker's voice to generate speech as if it came from another (target) speaker. Generating a voice style transfer includes modifying the acoustic characteristics of speech signal 200 to match (or generally match subject to a predefined threshold) a target speaker representation. In some implementations, the target speaker includes a predefined set of acoustic characteristics associated with a particular speaker. As discussed above concerning speaker change detection and in some implementations, speaker change detection system 204 provides speaker information 208 to voice converter system 210 indicating speaker embedding information (e.g., speaker embeddings or references to speaker embeddings) for particular speakers. In some implementations, with speaker information 208, voice converter system 210 selects a target speaker representation for the voice style transfer of the speech signal.

In one example, selecting a target speaker representation for the voice conversion includes selecting (e.g., automatically and/or as a predefined setting) a closest match between the speech signal and a target speaker representation. For example, speech privacy process 10 compares acoustic embeddings of the speech signal and each target speaker representation of a database of target speaker representations to determine a closest match. In this example, the closest match may be most vulnerable to identifying a speaker associated with a speech signal given the closeness between the speech signal and the target speaker representation. In another example, selecting a target speaker representation for the voice conversion includes selecting (e.g., automatically and/or as a predefined setting) a furthest match between the speech signal and a target speaker representation. For example, speech privacy process 10 may compare acoustic embeddings of the speech signal and each target speaker representation of a database of target speaker representations to determine a furthest match. In this example, the furthest match may be less vulnerable to identifying a speaker associated with the speech signal given the difference between the speech signal and the target speaker representation.

In some implementations, speech privacy process 10 trains voice converter system 210 to have a conditioning vector input which specifies a type of pseudo-speech representation (e.g., a context type for sensitive content, a representation of the sensitive content for mapping to a predefined pseudo-speech representation). In one example, the vector (e.g., speaker information 208) is activated manually (e.g., via a GUI). In another example, the vector (e.g., speaker information 208) is activated via an ASR-NLU system (e.g., sensitive speech identification system 202) that identifies classes of sensitive information (e.g., names, dates, etc.) and indicates a particular pseudo-speech representation.

Referring again to FIG. 2, speech privacy process 10 generates a secure speech signal (e.g., secure speech signal 216) using voice converter system 210 where sensitive speech signal 200 is generated by modifying non-sensitive portions of speech signal 200 match a target speaker embedding and by replacing sensitive portions (e.g., sensitive portion 206) with pseudo-speech representations (e.g., pseudo-speech representation 214). In some implementations, speech privacy process 10 provides secure speech signal 216 to a speech processing system (e.g., speech processing system 218).

In some implementations, speech privacy process 10 performs 106 speech processing on the speech signal and the pseudo-speech representation of the sensitive portion using a speech processing system. For example, speech privacy process 10 processes secure speech signal 216 using a speech processing system (e.g., speech processing system 218). Examples of speech processing includes automated speech recognition (ASR), speaker identification, biometric speaker verification, etc. In some implementations, performing 106 speech processing on the speech signal includes generating 116 a transcript of the speech signal by processing the speech signal and the pseudo-speech representation of the sensitive portion using an automated speech recognition (ASR) system. For example, suppose speech processing system 218 is an ASR system configured to generate a transcript (e.g., transcript 220) of the speech signal 200. ASR system 218 is trained to 'ignore' the voice converter-generated pseudo-speech representations and mark them as areas of sensitive information in the transcript. In some implementations, speech privacy process 10 saves the original data without the pseudo-speech representation in an encrypted form. In this example, when processing the transcript, speech processing system 218 is trained to delete the pseudo-speech representations. In another example, speech privacy process 10 populates the transcript (e.g., transcript 220) with the pseudo-representations. In this manner, sensitive portion 206 is not revealed in secure speech signal or the resultant speech processing (e.g., transcript 220). Accordingly, sensitive information in the form of PII or any other sensitive content is obscured without adding periods of blank audio and without modifying other acoustic properties in the speech signal (e.g., noise, reverberation, etc.).

In some implementations, speech privacy process 10 allows a participant to choose to have their sensitive information (e.g., PII) removed via voice converter (i.e., PII protected through voice transfer and pseudo-speech representations). For example, speech privacy process 10 provides an option (e.g., a button of a user interface) to selectively insert pseudo-speech representations in for sensitive segments (e.g., in the speech signal and the transcript).

In some implementations, speech privacy process 10 performs 106 speech processing on speech signal 200 to generate sensitive content-free training data. For example, suppose speech signal 200 concerns a medical encounter, with some PII detected; but not entirely reliably. In this example, suppose a user desires PII-free training data. Accordingly, speech privacy process 10 identifies sensitive portions and generates pseudo-speech representations of those identified portions. Additionally, speech privacy process 10 generates 104 pseudo-speech representations for other portions that may or may not represent sensitive speech. In this example, these additional portions include speech portions with low ASR confidence (e.g., based on a threshold) and/or a confidence score indicative of a sensitive portion within a predefined range of the threshold. For example, suppose speech signal 200 includes portions that do not meet the threshold of sensitive content but have low confidence when processed by a speech processing system (e.g., ASR system 218). At training time, speech privacy process 10 trains speech processing system 218 on the secure data (e.g., data with pseudo-speech representations). In this example, the power of deep learning can "learn" to ignore the pseudo-speech representations.

Watermarking Pseudo-Speech Representations

Figure 3:
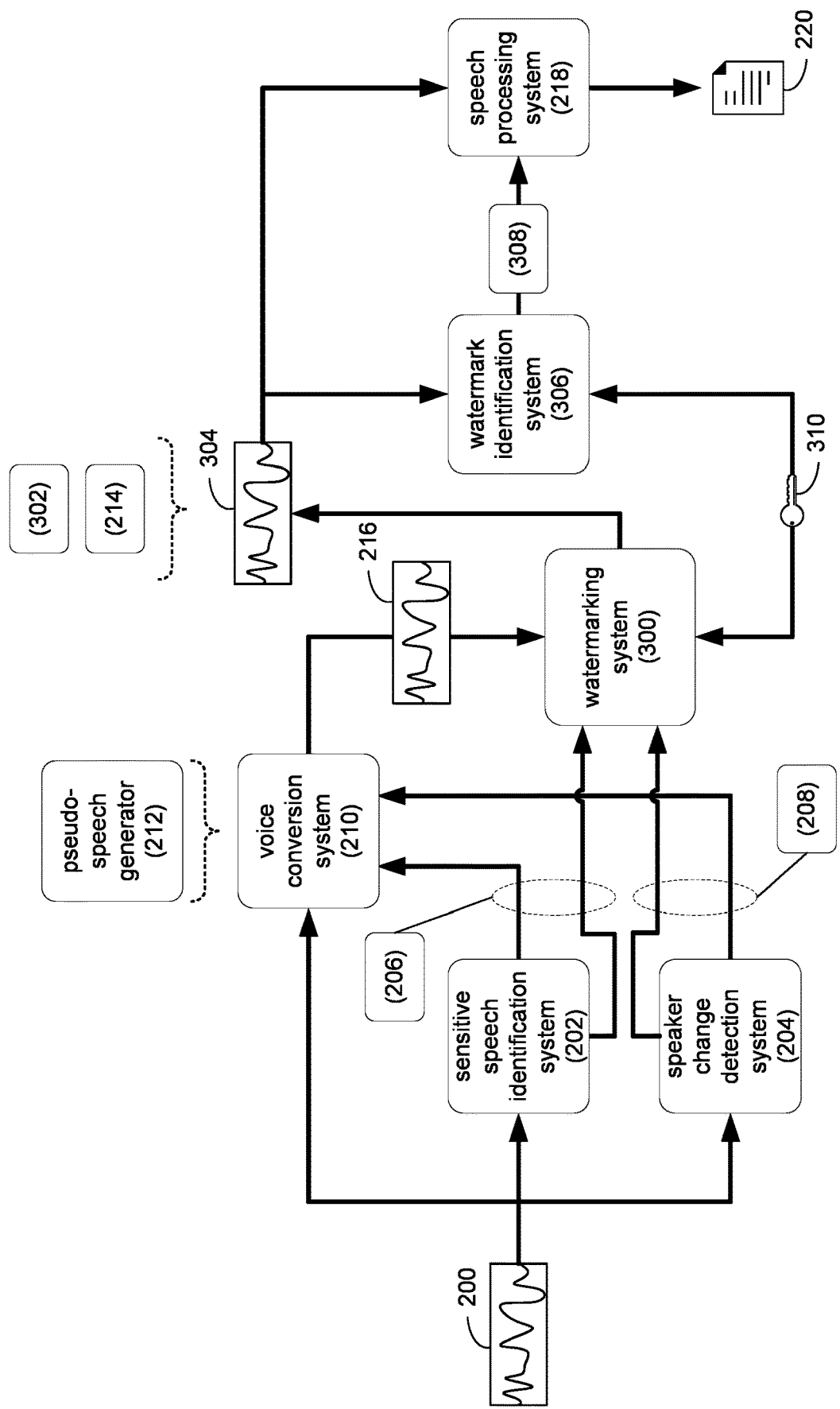

In some implementations, speech privacy process 10 marks 118 the pseudo-speech representation of the sensitive portion with a watermark. A watermark is a portion of metadata within a speech signal that is modified or added to describe the secure speech signal or its content. Referring also to FIG. 3, sensitive speech identification system 202 provides sensitive portion 206 to a watermarking system (e.g., watermarking system 300). In some implementations, speaker change detection system 204 provides speaker information 208 to watermarking system 300. Voice conversion system 210 provides secure speech signal 216 to watermarking system 300. With sensitive portion 206, speaker information 208, and/or secure speech signal 216, watermarking system 300 generates a watermark (e.g., watermark 302) that is loaded into the payload of secure speech signal 216 to produce watermarked secure speech signal 304 such that a modified or informed speech processing system can decode the secure speech signal. In some implementations, speaker information 208 is encoded in the watermark so that speech processing system 218 can attach a speaker name or identifier to transcript 220.

In some implementations, a watermark identification system (e.g., watermark identification system 306) processes secure speech signal 216 to identify a watermark. For example, watermark identification system 306 is a software and/or hardware component configured to identify the presence of a watermark in the secure speech signal. In some implementations, watermark identification system 306 processes secure speech signal 216 to identify a watermark (e.g., watermark 302) from watermarked secure speech signal 304. In response to identifying watermark 302, watermark identification system 306 provides watermark information (e.g., watermark information 308) to speech processing system 218. In one example, watermark information 308 provides information concerning a specific type of sensitive portion (e.g., a name reference, a date reference, etc.). In another example, watermark information 308 is a pseudo-speech representation to be added by speech processing system 218 when pseudo-speech representations are identified in secure speech signal 304. In this example, watermark information 308 acts as a mapping between specific pseudo-speech representations in watermarked secure speech signal 304 and text to use in transcript 220.

In some implementations, speech privacy process 10 secures sensitive portions using a key in the watermarking of secured speech signal 200. For example, speech privacy process 10 synthesizes speech signal 200 with configurable pseudo-speech representations for sensitive regions using voice conversion (e.g., voice style transfer (VST)), overlaid with a watermark (e.g., watermark 302) that specifies a key (e.g., key 310) to allow decoding via speech processing system 218. In this example, the actual audio (e.g., watermarked secure speech signal 304) is never directly decoded (e.g., where pseudo-speech representations are converted back to sensitive portion), but only speech processing system 218 output has the sensitive information. In one example, the use of key 310 can prevent leaks from Quality Documentation Specialists (QDS) agents. For example, a QDS agent receives secure speech signal with pseudo-speech representations in sensitive portions. For certain consultations, the QDS agent is provided with the ability to recover the sensitive information via key 310.

In some implementations, speech privacy process 10 generates, for each speech processing operation (e.g., generating a transcript), a random permutation table (mapping phonemes to phonemes), under control of a key (e.g., key 310). Speech privacy process 10 can transmit key 310 separately from secure speech signal 216. During the training of speech processing system 218, speech privacy process 10 applies the key to decode the pseudo-speech representations and restore the original sensitive portions. For example, speech privacy process 10 processes the speech signal via a modulation domain decomposition into carriers and modulators and permutes the modulator and carrier signals using key 310. In some implementations, process selects a particular permutation, controlled by key 310 which maps some channels, (or groups of channels) into others, chosen so that the re-synthesized signal sounds unintelligible. Speech privacy process 10 encodes speech signal 200 with the selected permutation inversion and watermarks the result with a key (e.g., key 310) to the permutation. To decode, speech privacy process 10 extracts the watermark using watermark identification system 306 and applies the inverse of the permutation based on key 310. Accordingly, speech privacy process 10 performs speech processing on the speech signal, the pseudo-speech representation of the sensitive portion, and the watermark using the speech processing system by regenerating 120 the sensitive content from the pseudo-speech representation using the watermark.

Transcript-Based Pseudo-Speech Representations

Figure 4:
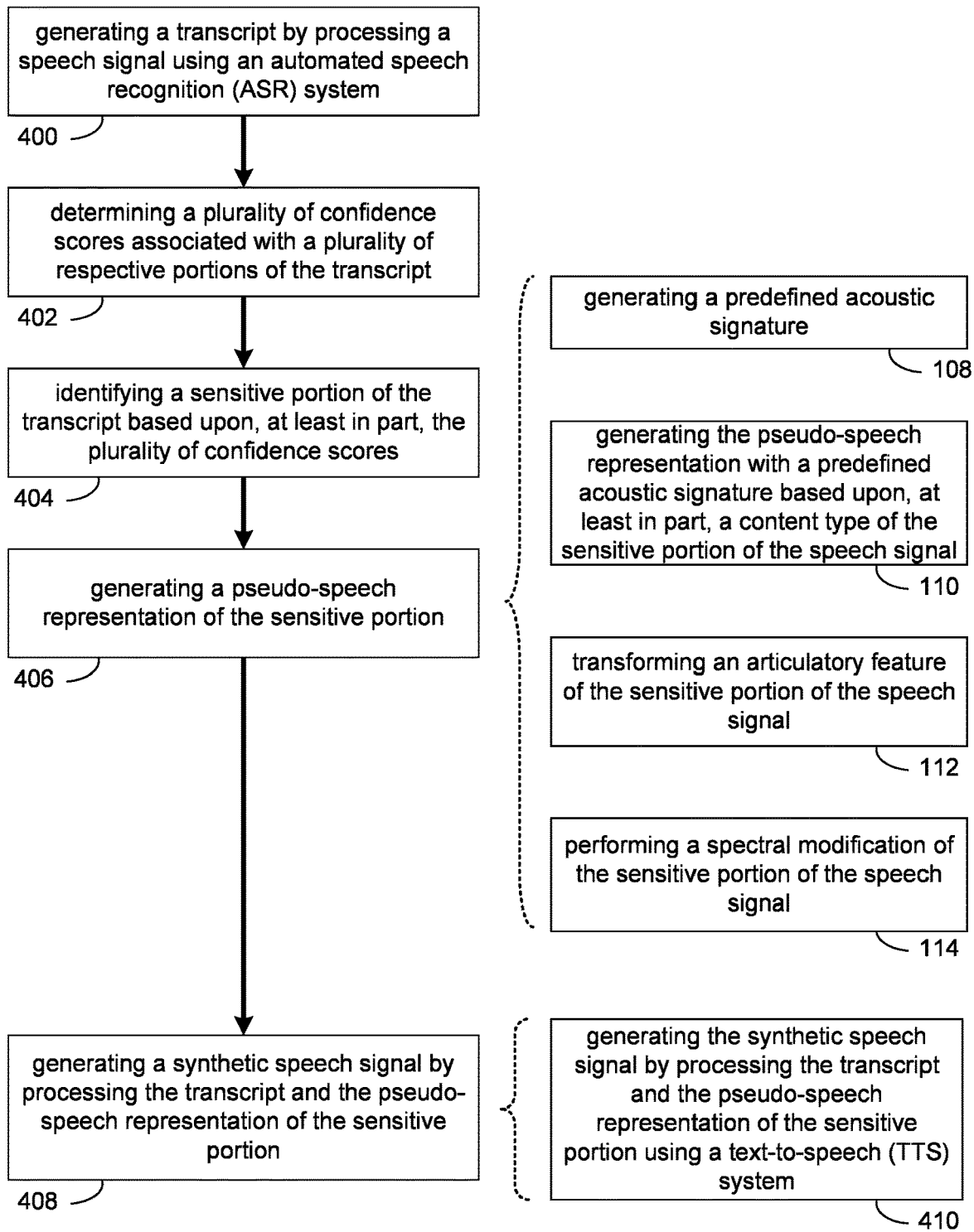
FIG. 4 is a flow chart of one implementation of the speech privacy process of FIG. 1.

Referring also to FIG. 4 and in some implementations, speech privacy process 10 deals with "securing" the output of a speech processing system (e.g., an automated speech recognition (ASR)). For example, suppose that downstream processing does not have access to the original speech signal, just the ASR output. In this example, speech privacy process 10 generally processes an input speech signal using an ASR system, detects sensitive portions from the resulting transcript, inserts pseudo-speech representations into the transcript, using text-to-speech (TTS) trained to reproduce the pseudo-speech representation acoustically. In this manner, pseudo-speech representations are generated textually and used to generate synthetic speech signals without sensitive information.

Figure 5:
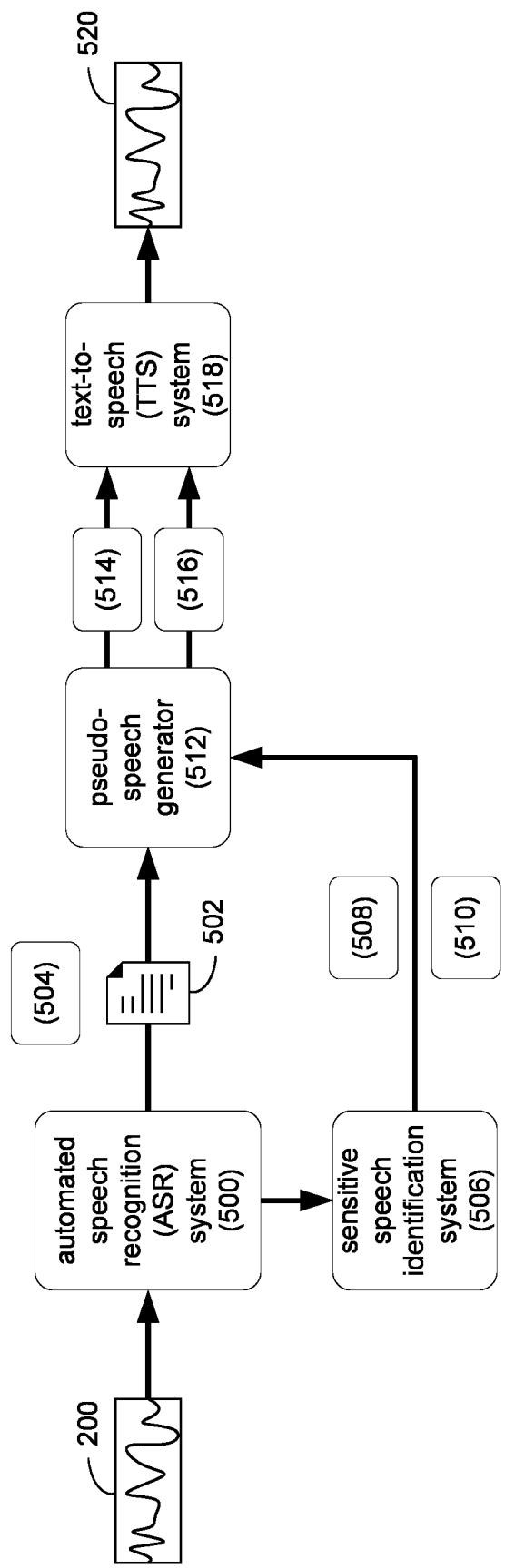
FIG. 5 is a diagrammatic view of the speech privacy process of FIG. 1.

Referring also to FIG. 5 and in some implementations, speech privacy process 10 generates 400 a transcript by processing a speech signal using an automated speech recognition (ASR) system. For example, speech privacy process 10 uses ASR system 500 to generate transcript 502 from input speech signal 200.

In some implementations, speech privacy process 10 determines 402 a plurality of confidence scores associated with a plurality of respective portions of the transcript. In addition to transcript 502, speech privacy process 10 generates an ASR confidence level (e.g., ASR confidence level 504) associated with the generation of each respective portion of transcript 502 by ASR system 500.

In some implementations, speech privacy process 10 identifies 404 a sensitive portion of the transcript. For example and as discussed above, speech privacy process 10 identifies 404 sensitive portions of transcript 502 using sensitive speech identification system 506. In the example of FIG. 5, sensitive speech identification system 506 processes each portion of ASR system 500 to identify sensitive portion 508 with a corresponding sensitivity confidence level (e.g., sensitivity confidence level 510). Speech privacy process 10 provides sensitive portion 508 and sensitivity confidence level 510 to pseudo-speech generator 512.

In some implementations, speech privacy process 10 generates 406 a pseudo-speech representation of the sensitive portion. For example, with transcript 502, ASR confidence level 504, sensitive portion 508, and sensitivity confidence level 510, speech privacy process 10 generates 406 a pseudo-speech representation of sensitive portion 508 based upon, at least in part, the ASR confidence level 504 and sensitivity confidence level 510. In one example, pseudo-speech generator 512 compares ASR confidence level 504 and sensitivity confidence level 510 to one or more thresholds within pseudo-speech generator 512 to determine whether to generate a pseudo-speech representation of the respective sensitive portion (e.g., sensitive portion 508) and/or respective portion of transcript 502. For example, suppose sensitive portion 508 is identified with sensitivity confidence level 510 of 95%. In this example, suppose that the threshold for sensitive portions is 75%. Accordingly, speech privacy process 10 generates 406 a pseudo-speech representation (e.g., pseudo-speech representation 514) for sensitive portion 508 as sensitivity confidence level 510 exceeds the threshold.

In another example, suppose that a portion of transcript 502 is identified with an ASR confidence level 504 of 65%. In this example, suppose that the ASR threshold is 50%. Accordingly, speech privacy process 10 passes the particular portion of transcript 502 without any modification as ASR confidence level 504 exceeds the threshold.

In another example, suppose sensitive portion 508 is identified with sensitivity confidence level 510 of 45%. In this example, suppose that the threshold for sensitive portions is 75%. Accordingly, speech privacy process 10 passes the particular portion of transcript 502 without any modification as sensitivity confidence level 510 does not exceed the threshold.

In another example, suppose that a portion of transcript 502 is identified with an ASR confidence level 504 of 35%. In this example, suppose that the ASR threshold is 50%. Accordingly, speech privacy process 10 generates 406 a pseudo-speech representation (e.g., pseudo-speech representation 514) for the portion of transcript 502 as ASR confidence level 504 does not exceed the threshold. As discussed above, pseudo-speech representations can include predefined acoustic signature, predefined acoustic signatures based on context type, a mapping of a sensitive portion to a predefined pseudo-speech representation, a transformation of an articulatory feature of the sensitive portion of the speech signal, and/or a spectral modifications.

In some implementations, speech privacy process 10 generates 408 a synthetic speech signal by processing the transcript and the pseudo-speech representation of the sensitive portion. For example, speech privacy process 10 generates 410 the synthetic speech signal by using a text-to-speech system (e.g., text-to-speech (TTS) system 518) to convert portions of transcript 502 (e.g., portion 516) and pseudo-speech representations (e.g., pseudo-speech representation 514) into a synthetic speech signal (e.g., synthetic speech signal 520). Using TTS system 518, speech privacy process 10 generates synthetic speech signal 520 by combining non-sensitive portions (e.g., portion 516) with pseudo-speech representations for corresponding sensitive portions (e.g., pseudo-speech representation 514). In this manner, synthetic speech signal 520 includes pseudo-speech representations in place of sensitive information such that sensitive content is acoustically unintelligible to a listener or speech processing system.

Figure 6:
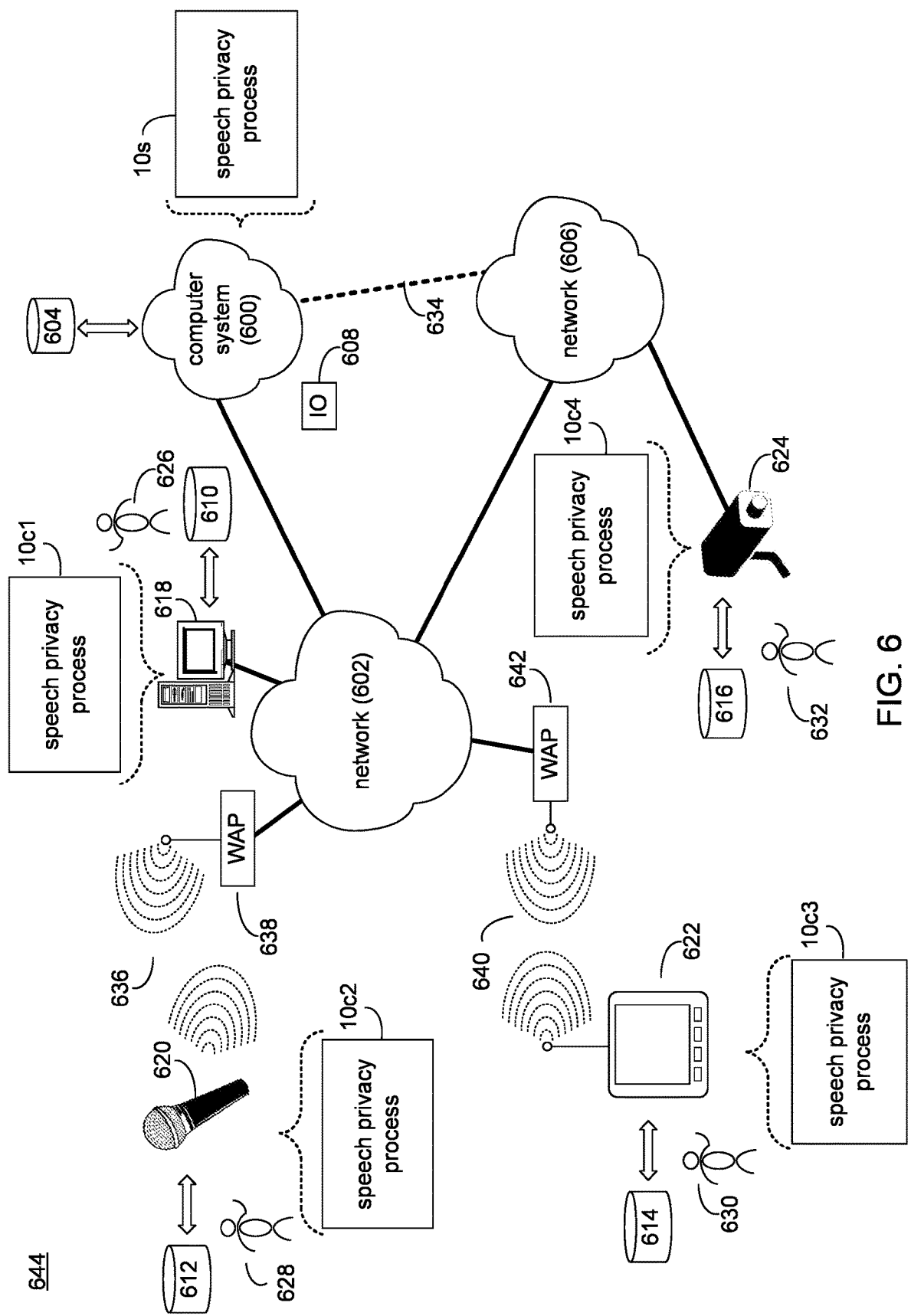
FIG. 6 is a diagrammatic view of computer system and a speech privacy process coupled to a distributed computing network.

System Overview:

Referring to FIG. 6, there is shown speech privacy process 10. Speech privacy process 10 may be implemented as a server-side process, a client-side process, or a hybrid server-side/client-side process. For example, speech privacy process 10 may be implemented as a purely server-side process via speech privacy process 10s. Alternatively, speech privacy process 10 may be implemented as a purely client-side process via one or more of speech privacy process 10c1, speech privacy process 10c2, speech privacy process 10c3, and speech privacy process 10c4. Alternatively still, speech privacy process 10 may be implemented as a hybrid server-side/client-side process via speech privacy process 10s in combination with one or more of speech privacy process 10c1, speech privacy process 10c2, speech privacy process 10c3, and speech privacy process 10c4.

Accordingly, speech privacy process 10 as used in this disclosure may include any combination of speech privacy process 10s, speech privacy process 10c1, speech privacy process 10c2, speech privacy process 10c3, and speech privacy process 10c4.

Speech privacy process 10s may be a server application and may reside on and may be executed by a computer system 600, which may be connected to network 602 (e.g., the Internet or a local area network). Computer system 600 may include various components, examples of which may include but are not limited to: a personal computer, a server computer, a series of server computers, a mini computer, a mainframe computer, one or more Network Attached Storage (NAS) systems, one or more Storage Area Network (SAN) systems, one or more Platform as a Service (PaaS) systems, one or more Infrastructure as a Service (IaaS) systems, one or more Software as a Service (SaaS) systems, a cloud-based computational system, and a cloud-based storage platform.

A SAN includes one or more of a personal computer, a server computer, a series of server computers, a minicomputer, a mainframe computer, a RAID device and a NAS system. The various components of computer system 600 may execute one or more operating systems.

The instruction sets and subroutines of speech privacy process 10*s*, which may be stored on storage device 604 coupled to computer system 600, may be executed by one or more processors (not shown) and one or more memory architectures (not shown) included within computer system 600. Examples of storage device 604 may include but are not limited to: a hard disk drive; a RAID device; a random-access memory (RAM); a read-only memory (ROM); and all forms of flash memory storage devices.

Network 602 may be connected to one or more secondary networks (e.g., network 604), examples of which may include but are not limited to: a local area network; a wide area network; or an intranet, for example.

Various IO requests (e.g., IO request 608) may be sent from speech privacy process 10*s*, speech privacy process 10*c*1, speech privacy process 10*c*2, speech privacy process 10*c*3 and/or speech privacy process 10*c*4 to computer system 600. Examples of IO request 608 may include but are not limited to data write requests (i.e., a request that content be written to computer system 600) and data read requests (i.e., a request that content be read from computer system 600).

The instruction sets and subroutines of speech privacy process 10*c*1, speech privacy process 10*c*2, speech privacy process 10*c*3 and/or speech privacy process 10*c*4, which may be stored on storage devices 610, 612, 614, 616 (respectively) coupled to client electronic devices 618, 620, 622, 624 (respectively), may be executed by one or more processors (not shown) and one or more memory architectures (not shown) incorporated into client electronic devices 618, 620, 622, 624 (respectively). Storage devices 610, 612, 614, 616 may include but are not limited to: hard disk drives; optical drives; RAID devices; random access memories (RAM); read-only memories (ROM), and all forms of flash memory storage devices. Examples of client electronic devices 618, 620, 622, 624 may include, but are not limited to, personal computing device 618 (e.g., a smart phone, a personal digital assistant, a laptop computer, a notebook computer, and a desktop computer), audio input device 620 (e.g., a handheld microphone, a lapel microphone, an embedded microphone (such as those embedded within eyeglasses, smart phones, tablet computers and/or watches) and an audio recording device), display device 622 (e.g., a tablet computer, a computer monitor, and a smart television), machine vision input device 624 (e.g., an RGB imaging system, an infrared imaging system, an ultraviolet imaging system, a laser imaging system, a SONAR imaging system, a RADAR imaging system, and a thermal imaging system), a hybrid device (e.g., a single device that includes the functionality of one or more of the above-references devices; not shown), an audio rendering device (e.g., a speaker system, a headphone system, or an earbud system; not shown), various medical devices (e.g., medical imaging equipment, heart monitoring machines, body weight scales, body temperature thermometers, and blood pressure machines; not shown), and a dedicated network device (not shown).

Users 626, 628, 630, 632 may access computer system 600 directly through network 602 or through secondary network 606. Further, computer system 600 may be connected to network 602 through secondary network 606, as illustrated with link line 634.

The various client electronic devices (e.g., client electronic devices 618, 620, 622, 624) may be directly or indirectly coupled to network 602 (or network 606). For example, personal computing device 618 is shown directly coupled to network 602 via a hardwired network connection. Further, machine vision input device 624 is shown directly coupled to network 606 via a hardwired network connection. Audio input device 622 is shown wirelessly coupled to network 602 via wireless communication channel 636 established between audio input device 620 and wireless access point (i.e., WAP) 638, which is shown directly coupled to network 602. WAP 638 may be, for example, an IEEE 802.11a, 802.11b, 802.11g, 802.11n, Wi-Fi™, and/or Bluetooth™ device that is capable of establishing wireless communication channel 636 between audio input device 620 and WAP 638. Display device 622 is shown wirelessly coupled to network 602 via wireless communication channel 640 established between display device 622 and WAP 642, which is shown directly coupled to network 602.

The various client electronic devices (e.g., client electronic devices 618, 620, 622, 624) may each execute an operating system, wherein the combination of the various client electronic devices (e.g., client electronic devices 618, 620, 622, 624) and computer system 600 may form modular system 644.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be used. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object-oriented programming language. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general-purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, not at all, or in any combination with any other flowcharts depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
receiving, by a speech privacy processor, a speech signal recorded during a medical encounter between a medical professional and a patient, wherein a sensitive portion of the speech signal includes Personally Identifiable Information (PII) of the patient;
processing, by the speech privacy processor, the speech signal to obtain a synthetic speech signal at least by converting the PII within the sensitive portion of the speech signal into a pseudo-speech representation of the PII in the synthetic speech signal using a voice converter, wherein the voice converter reduces an acoustic quality of one or more linguistic units associated with the PII by filtering the sensitive portion of the speech signal in a modulation domain to remove modulations above a predefined threshold, thereby generating the pseudo-speech representation of the PII, wherein the modulation domain includes carrier signals and modulators; and
transmitting, by the speech privacy processor, the synthetic speech signal to an automatic speech recognition (ASR) processor.

2. The computer-implemented method of claim 1, wherein the PII within the sensitive portion of the speech signal is converted into the pseudo-speech representation based on a predefined acoustic signature.

3. The computer-implemented method of claim 2, wherein the predefined acoustic signature is based upon, at least in part, a content type of the sensitive portion of the speech signal.

4. The computer-implemented method of claim 1, wherein converting the PII within the sensitive portion of the speech signal into the pseudo-speech representation includes transforming an articulatory feature of the sensitive portion of the speech signal.

5. The computer-implemented method of claim 1, wherein converting the PII within the sensitive portion of the speech signal into the pseudo-speech representation includes performing a spectral modification of the sensitive portion of the speech signal.

6. The computer-implemented method of claim 1, further comprising:
marking the pseudo-speech representation with a watermark.

7. A computing system comprising:
a processor; and
a memory storing programming instructions for execution by the processor, the programming instructions, upon execution by the processor, causing the computing system to perform the following steps:
receiving, by a speech privacy processor, a speech signal recorded during a medical encounter between a medical professional and a patient, wherein a sensitive portion of the speech signal includes Personally Identifiable Information (PII) of the patient;
processing, by the speech privacy processor, the speech signal to obtain a synthetic speech signal at least by converting the PII within the sensitive portion of the speech signal into a pseudo-speech representation of the PII in the synthetic speech signal using a voice converter, wherein the voice converter reduces an acoustic quality of one or more linguistic units associated with the PII by filtering the sensitive portion of the speech signal in a modulation domain to remove modulations above a predefined threshold, thereby generating the pseudo-speech representation of the PII, wherein the modulation domain includes carrier signals and modulators; and
transmitting, by the speech privacy processor, the synthetic speech signal to an automatic speech recognition (ASR) processor.

8. The computing system of claim 7, wherein the PII within the sensitive portion of the speech signal is converted into the pseudo-speech representation based on a predefined acoustic signature.

9. The computing system of claim 8, wherein the predefined acoustic signature is based upon, at least in part, a content type of the sensitive portion of the speech signal.

10. The computing system of claim 7, wherein converting the PII within the sensitive portion of the speech signal into the pseudo-speech representation includes transforming an articulatory feature of the sensitive portion of the speech signal.

11. The computing system of claim 7, wherein converting the PII within the sensitive portion of the speech signal into the pseudo-speech representation includes performing a spectral modification of the sensitive portion of the speech signal.

12. The computer-implemented method of claim 1, wherein the ASR processor is located remotely from the speech privacy processor, and wherein the synthetic speech signal is transmitted over a network that communicatively couples the speech privacy processor to the ASR processor.

13. The computer-implemented method of claim 1, wherein reducing the acoustic quality of the one or more linguistic units associated with the PII renders the pseudo-speech representation of the PII generally unintelligible during speech recognition by the ASR processor.

14. The computer-implemented method of claim 1, wherein the voice converter reduces the acoustic quality of the one or more linguistic units associated with the PII by shortening a duration of the one or more linguistic units associated with the PII.

15. The computer-implemented method of claim 1, wherein the voice converter reduces the acoustic quality of the one or more linguistic units associated with the PII by reducing a clarity of articulation of the one or more linguistic units associated with the PII.

16. A computer program product residing on a non-transitory computer readable medium having programming instructions stored thereon which, when executed by a processor of a system, cause the system to perform the following operations:
receiving, by a speech privacy processor, a speech signal recorded during a medical encounter between a medical professional and a patient, wherein a sensitive portion of the speech signal includes Personally Identifiable Information (PII) of the patient;
processing, by the speech privacy processor, the to obtain a synthetic speech signal at least by converting the PII within the sensitive portion of the speech signal into a pseudo-speech representation of the PII in the synthetic speech signal using a voice converter, wherein the voice converter reduces an acoustic quality of one or more linguistic units associated with the PII by filtering the sensitive portion of the speech signal in a modulation domain to remove modulations above a predefined threshold, thereby generating the pseudo-speech representation of the PII, wherein the modulation domain includes carrier signals and modulators; and
transmitting, by the speech privacy processor, the synthetic speech signal to an automatic speech recognition (ASR) processor.

17. The computer program product of claim 16, wherein the voice converter reduces the acoustic quality of the one or more linguistic units associated with the PII by shortening a duration of the one or more linguistic units associated with the PII.

18. The computer program product of claim 16, wherein the voice converter reduces the acoustic quality of the one or more linguistic units associated with the PII by reducing a clarity of articulation of the one or more linguistic units associated with the PII.

* * * * *